United States Patent
Ouyang et al.

(10) Patent No.: US 10,448,437 B2
(45) Date of Patent: Oct. 15, 2019

(54) ENHANCED BLUETOOTH CHANNEL ESTABLISHMENT

(71) Applicant: Intel IP Corporation, Santa Clara, CA (US)

(72) Inventors: Xuemei Ouyang, Mountain View, CA (US); Marcel Holtmann, Kirchlengern (DE); Harish Balasubramaniam, San Jose, CA (US); Oren Haggai, Kefar Sava (IL); Chethan Tumkur Narayan, Bengaluru (IN); Luiz von Dentz, Espoo (FI); Robert D. Hughes, Tualatin, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/039,643

(22) Filed: Jul. 19, 2018

(65) Prior Publication Data

US 2019/0045557 A1 Feb. 7, 2019

Related U.S. Application Data

(60) Provisional application No. 62/535,597, filed on Jul. 21, 2017.

(51) Int. Cl.
*H04W 76/10* (2018.01)
*H04W 4/80* (2018.01)

(52) U.S. Cl.
CPC ............. *H04W 76/10* (2018.02); *H04W 4/80* (2018.02)

(58) Field of Classification Search
CPC .................................................. H04L 12/40058
See application file for complete search history.

(56) References Cited

U.S. PATENT DOCUMENTS

| | | | | |
|---|---|---|---|---|
| 2001/0024447 | A1* | 9/2001 | Yoshio | G11B 20/12 370/421 |
| 2002/0041603 | A1* | 4/2002 | Kato | H04L 12/12 370/465 |
| 2009/0034498 | A1* | 2/2009 | Banerjea | H04W 76/15 370/338 |
| 2011/0026542 | A1* | 2/2011 | Hatakeyama | H04L 12/40058 370/431 |
| 2011/0026707 | A1* | 2/2011 | Hatakeyama | H04L 12/40058 380/42 |
| 2014/0321321 | A1* | 10/2014 | Knaappila | H04W 52/0209 370/254 |
| 2017/0171798 | A1* | 6/2017 | Song | H04W 48/12 |
| 2017/0244576 | A1* | 8/2017 | Batra | H04L 12/40058 |

\* cited by examiner

*Primary Examiner* — Cindy Trandai
(74) *Attorney, Agent, or Firm* — Patent Capital Group

(57) ABSTRACT

This disclosure describes an enhanced Bluetooth channel establishment. A device may identify an isochronous connection oriented (ICO) command for a Bluetooth communication. The device may send a first ICO start command from a first link layer (LL) to a second LL, and the first LL may receive a first ICO start confirmation from the second LL. The first LL may then send a second ICO start command to a third LL, and the first LL may receive a second ICO start confirmation from the third LL. A third ICO start confirmation may then be sent. The device may also have an ICO request and response exchange between LL's.

16 Claims, 16 Drawing Sheets

| Command | OCF | Command Parameters | Return Parameters |
|---|---|---|---|
| LE Setup ICO Channel | TBD | Modify, Channel_Handle, Stream_ID, Channel_ID, Channel_Interval, Number_of_SubEvents, Max_Payload_Size_M_TO_S, Max_Payload_Size_S_TO_M, PHY_Type_M_TO_S, PHY_Type_S_TO_M, FT_M_TO_S, FT_S_TO_M, BN_M_TO_S, BN_S_TO_M | Status, Channel_Handle |

FIG. 2B

ENHANCED BLUETOOTH CHANNEL ESTABLISHMENT

CROSS-REFERENCE TO RELATED APPLICATIONS

This is a non-provisional patent application derived from U.S. provisional application Ser. 62/535,597 filed on Jul. 21, 2017, and claims priority to that date for all applicable subject matter.

TECHNICAL FIELD

This disclosure generally relates to systems and methods for wireless communications and, more particularly, to an enhanced bluetooth channel establishment.

BACKGROUND

Wireless devices are becoming widely prevalent and are increasingly requesting access to wireless channels. Wireless devices in a communication network may improve transmissions through efficient operations.

BRIEF DESCRIPTION OF THE DRAWINGS

FIG. 2B illustrates a table for an enhanced Bluetooth (BT) channel setup, in accordance with one or more example embodiments of the present disclosure.

DETAILED DESCRIPTION

Figure 1:
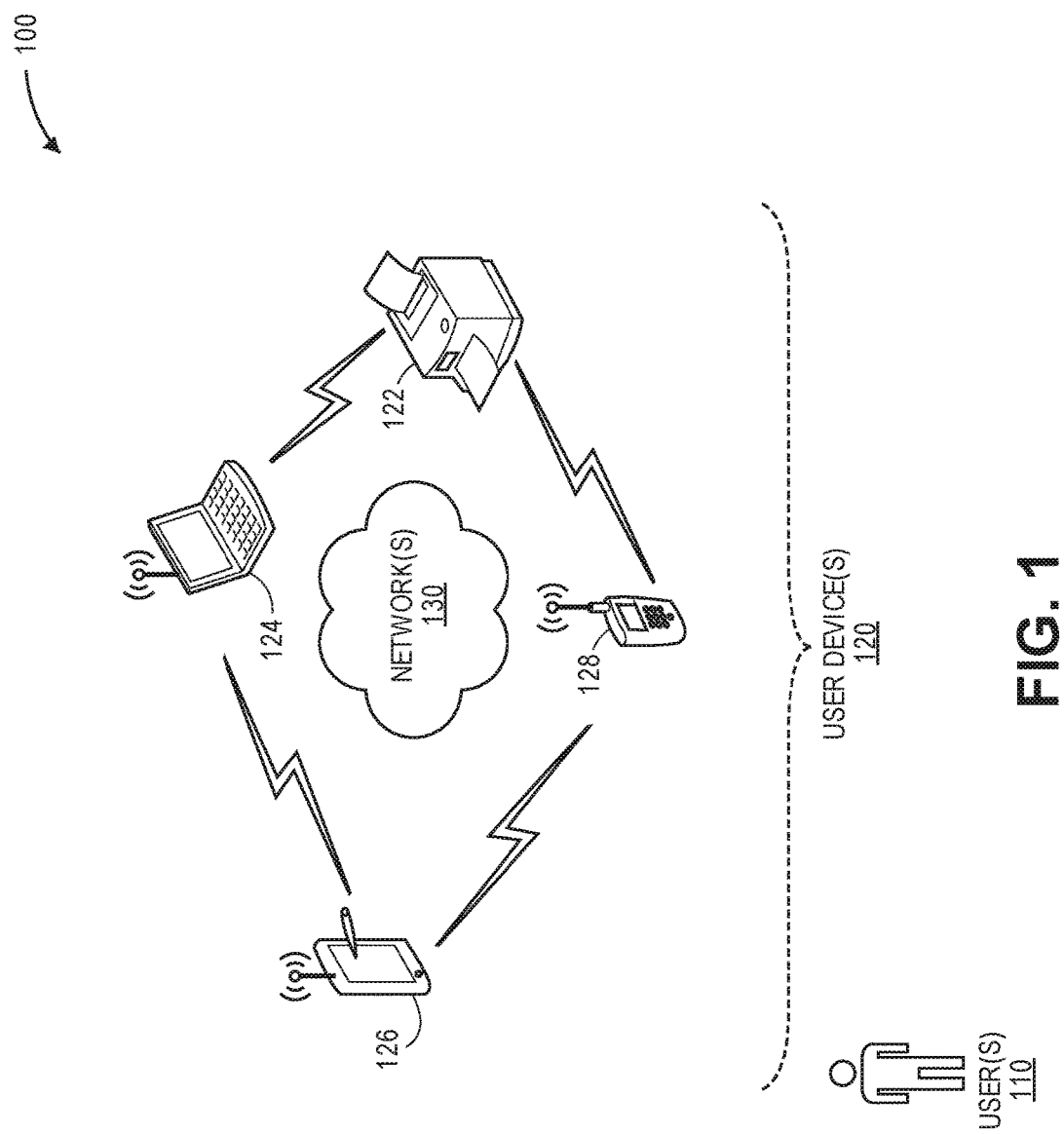
FIG. 1 depicts a network diagram illustrating an example network environment, according to one or more example embodiments of the disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The Bluetooth Special Interest Group is working on the Bluetooth Low Energy based second generation Bluetooth (BT) audio architecture. The Current Core specification has defined the mechanism for how to open an isochronous connection oriented channel (ICO) as a pipe to send a BT audio stream coming from a host device. Per the current defined mechanism, when a host device sends down a host controller interface (HCI) command for link layer (LL) channel configuration and enables the negotiation process, the LL may negotiate with the other end of a BT device at the link layer and open the ICO channel, which may start to schedule time to use the air medium at the negotiated anchor point in this command.

In addition, the Bluetooth Special Interest Group is working on the Bluetooth Low Energy based second generation BT audio architecture in which ICO may be set up with a coordinated set of a device, such as hearing aid devices. Based on the current released working specification, when a controller receives the command to open an ICO channel, the parameters to setup ICO channel may be negotiated for all channels even if they reside in the same set of device, such as one set of ear pieces which contains two separate ear buds.

Based on the current host operation definition, for one audio stream, multiple link layer channels may be opened on one device, which may contain two or more sub-devices. For example, when an audio stream is a stereo stream and needs to be sent to two different ear pieces as for left and right channels, at least two ICO channels may need to be opened on the master device, which may be sending the audio contents to the two ear pieces.

Because there may be no coordination between the open time on these two channels due to, for example, the host device being able to send down the channel open requests for these two channels at an uncertain time interval in between. In addition, even if host device sends down the commands at the same time, the wireless channel condition difference may result in the two channel negotiation time being significantly different, as one channel may be opened and may start to use the air medium significantly before the other channel.

From host device point of view, without an indication that both channels are ready, a host device should not send down any real audio contents to a single channel to avoid an additional stream synchronization issue at two ear pieces. A host device may not send anything on the already opened link layer ICO channel, but may rather just indicate that some empty packet needs to be sent at the link layer. In this case, the opened ICO channel may be using precious air medium, but doing nothing. This scenario may increase overall BT controller power consumption, and may impact performance of BT coexistence with other wireless communication systems such as WiFi because a BT system may claim to use the air medium at those scheduled time slots.

In addition, based on the currently defined specification, because a set of parameters for two channels may be negotiated with each sub-device separately, there may be different parameter sets coming from different ear pieces, and a master device may need to renegotiate again with both devices. Such a scenario may result in an infinite loop with some misbehaving ear piece. As a result, channel setup may take too long or may never be established, which in both cases may lead to a bad user experience.

The above descriptions are for purposes of illustration and are not meant to be limiting. Numerous other examples, configurations, processes, etc., may exist, some of which are described in greater detail below. Example embodiments will now be described with reference to the accompanying figures.

In one or more embodiments, the LL layer ICO channel configuration parameter negotiation and channel start time negotiation may be separated. For example, adding one additional LL command and one more HCI command may be added to the current core specification to make the channel negotiation more efficient.

In one or more embodiments, controller power consumption may be reduced, and the BT sharing air media with WiFI may be reduced, which may improve a BT-WiFI performance.

In one or more embodiments, one or more additional HCI commands and one or more additional LL commands may be added to open the channel after all channel configuration negotiation has been done. In an example, two channels may be used so that the time interval uncertainty between the open moments for ICO channels may be more tightly controlled and may reduce the air medium time wasted when there is no real data to transmit.

In one or more embodiments, the negotiation of ICO channel parameters may be limited to a primary device, and the same set of parameters may be sent to a secondary device without further negotiation. The primary device may be claimed during the service discovery between the two parties that may connect with each other. If the device set has large capability difference, such as soundbar and subwoofer combination, the primary device may have the responsibility to take the secondary device's needs into consideration during the negotiation.

In one or more embodiments, results may include reducing ICO setup time for efficiency, improving reliability of link establishment, and improving user experience.

FIG. 1 is a network diagram illustrating an example wireless network 100 of a flexible connectivity framework system, according to some example embodiments of the present disclosure. Wireless network 100 can include one or more user devices 120 (e.g., 122, 124, 126, or 128), which may communicate in accordance with wireless standards, such as Bluetooth and the IEEE 802.11 communication standards, over network(s) 130. In one embodiment, the one or more user devices 120 may be utilized by one or more user(s) 110 for wireless communications in accordance with Bluetooth and the IEEE 802.11 communication standards. For example, the user devices 120 may be Bluetooth devices that may perform connectivity procedures with one another in order to set up a Bluetooth data path. In one embodiment, the user devices 120 may utilize a Bluetooth data path negotiation procedure defined to enable data transmission between two Bluetooth devices. This negotiation procedure may be an associative process (similar to an Access Point-Station (AP-STA) process in a typical Wi-Fi infrastructure. In Wi-Fi, a station which exchanges data (e.g., a transmitting station) with another station (e.g., receiving station), should ensure that a potential interferer would not transmit at the same time and interfere with the data exchange. For this goal, a protection mechanism may be deployed by the transmitting station to defer any transmission by an interferer for a known period of time.

In the example of FIG. 1, a data path may be setup between two or more wireless devices (e.g., user device(s) 120) in order to exchange data. In one embodiment, two or more Bluetooth devices may utilize high throughput/very high throughput (HT/VHT) transmission rates.

In one embodiment, a user device 120 that switches into a channel may check its own database for the relevant channel and use that information to enable protection, by using rules from the Bluetooth and IEEE 802.11 communication standards, with the aforementioned fields in the database. When working in the channel, if a user device 120 detects any change in one of the aforementioned fields based on the Bluetooth and IEEE 802.11 communication standards, it may update the fields in its database and continue to work with the new protection configuration resulting from the change.

Figure 5:
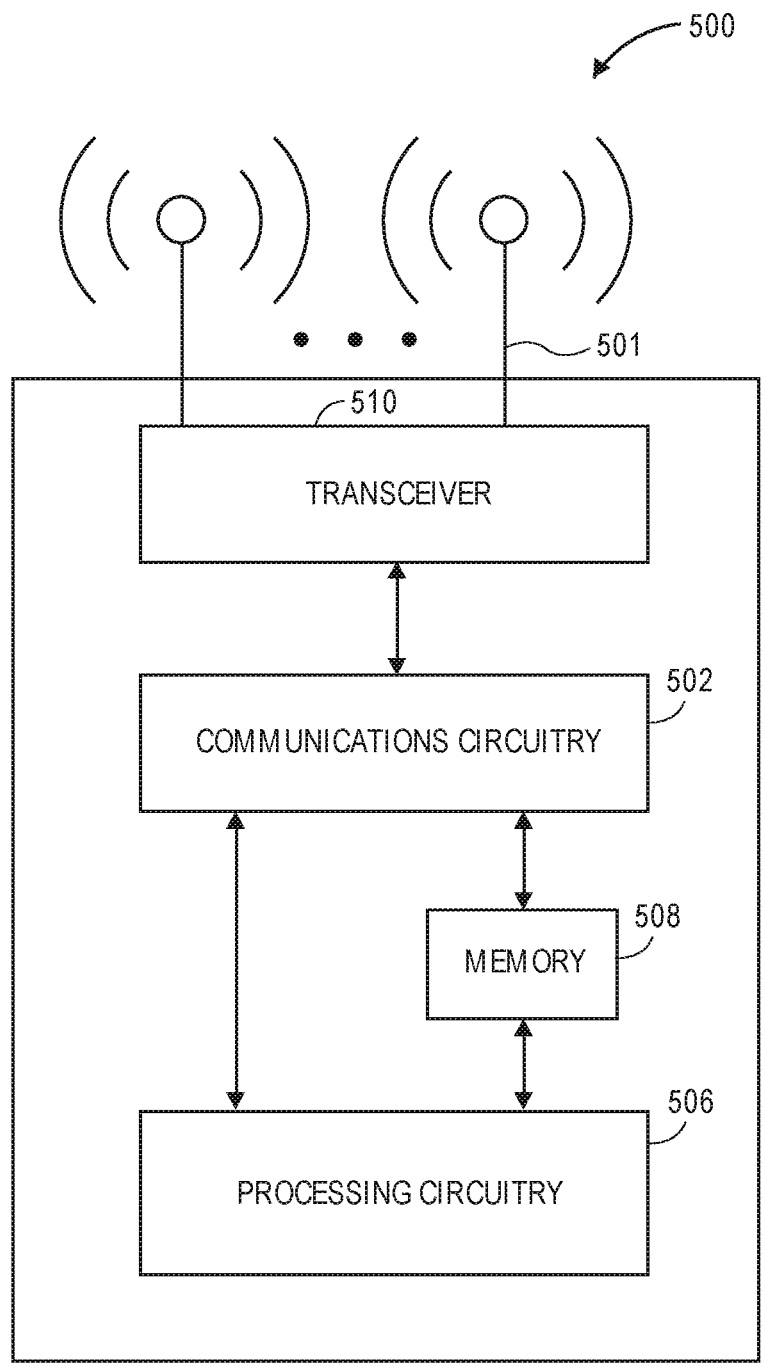
FIG. 5 illustrates a functional diagram of an example communication station that may be suitable for use as a user device, in accordance with one or more example embodiments of the disclosure.
Figure 6:
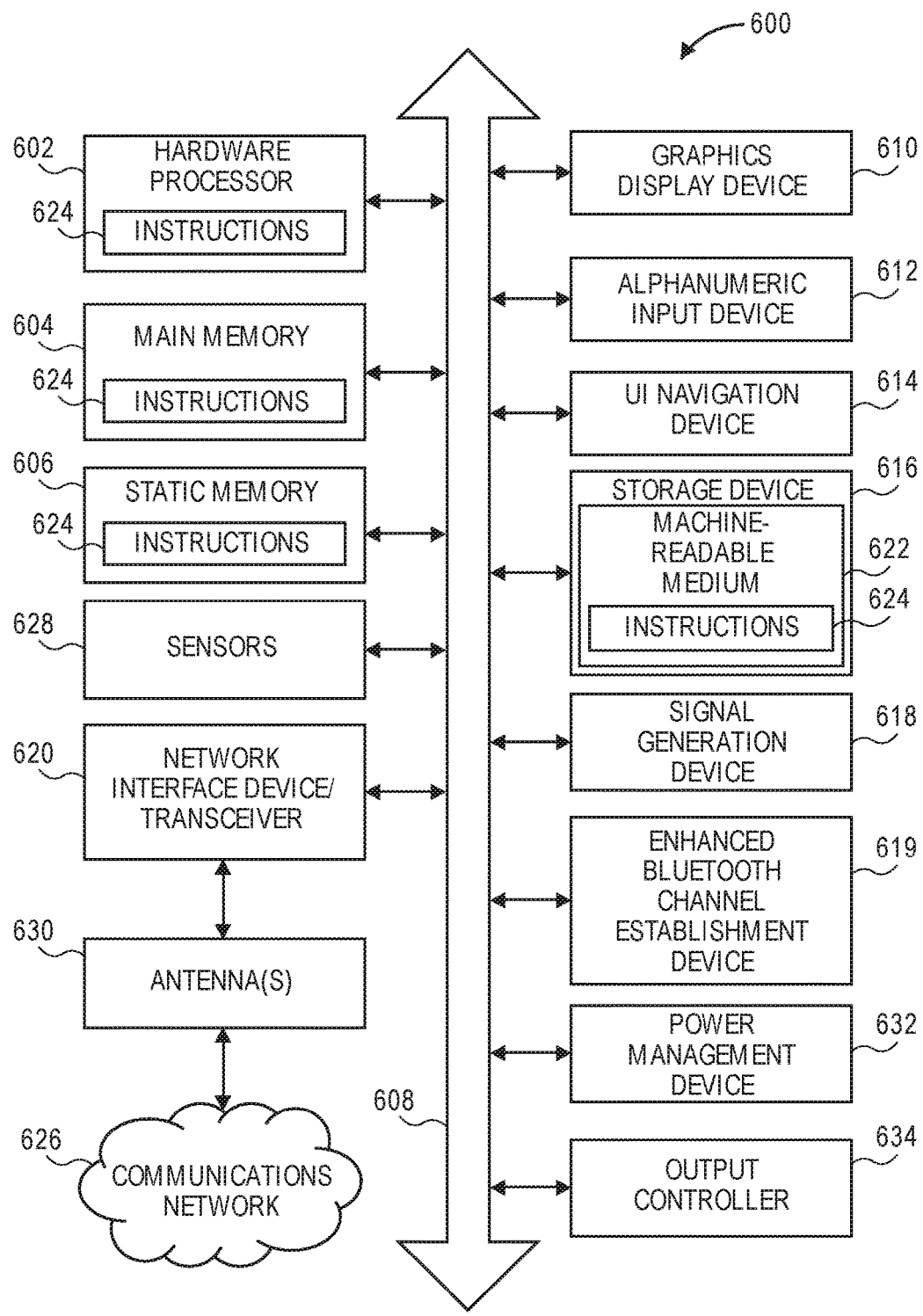
FIG. 6 illustrates a block diagram of an example machine upon which any of one or more techniques (e.g., methods) may be performed, in accordance with one or more example embodiments of the disclosure.

In some embodiments, the user devices 120 can include one or more computer systems similar to that of the functional diagram of FIG. 5 and/or the example machine/system of FIG. 6.

One or more illustrative user device(s) 120 may be operable by one or more user(s) 110. The user device(s) 120 (e.g., 122, 124, 126, or 128) may include any suitable processor-driven user device including, but not limited to, a desktop user device, a laptop user device, a server, a router, a switch, an access point, a smartphone, a tablet, a wearable wireless device (e.g., a bracelet, a watch, glasses, a ring, etc.), and so forth.

Any of the user devices 120 (e.g., 122, 124, 126, or 128) may be configured to communicate with each other and any other component of the wireless network 100 directly and/or via the one or more communications networks 130, wirelessly or wired.

Any of the communications networks 130 may include, but not be limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user devices 120 (e.g., 122, 124, 126, or 128) may include one or more communications antennas. Communications antennas may be any suitable type of antenna corresponding to the communications protocols used by the user device(s) 120. Some non-limiting examples of suitable communications antennas include Bluetooth antennas, Wi-Fi antennas, IEEE 802.11 family of standards compatible antennas, directional antennas, non-directional antennas, dipole antennas, folded dipole antennas, patch antennas, MIMO antennas, or the like. The communications antenna may be communicatively coupled to a radio component to transmit and/or receive signals, such as communications signals, to and/or from the user devices 120 (e.g., 122, 124, 126, or 128).

Any of the user devices 120 (e.g., 122, 124, 126, or 128) may include any suitable radio and/or transceiver for transmitting and/or receiving radio frequency (RF) signals in the bandwidth and/or channels corresponding to the communications protocols utilized by any of the user device(s) 120 to communicate with each other. The radio components may include hardware and/or software to modulate and/or demodulate communications signals according to pre-established transmission protocols. The radio components may further have hardware and/or software instructions to communicate via one or more Bluetooth, Wi-Fi, and/or Wi-Fi Direct protocols, as standardized by the Bluetooth and the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n), 5 GHz channels (e.g., 802.11n, 802.11ac), or 60 GHz channels (e.g., 802.11ad). In some embodiments, non-Wi-Fi protocols may be used for communications between devices, such as Bluetooth, dedicated short-range communication (DSRC), ultra-high frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

It is understood that the above descriptions are for purposes of illustration and are not meant to be limiting.

Figure 2A:
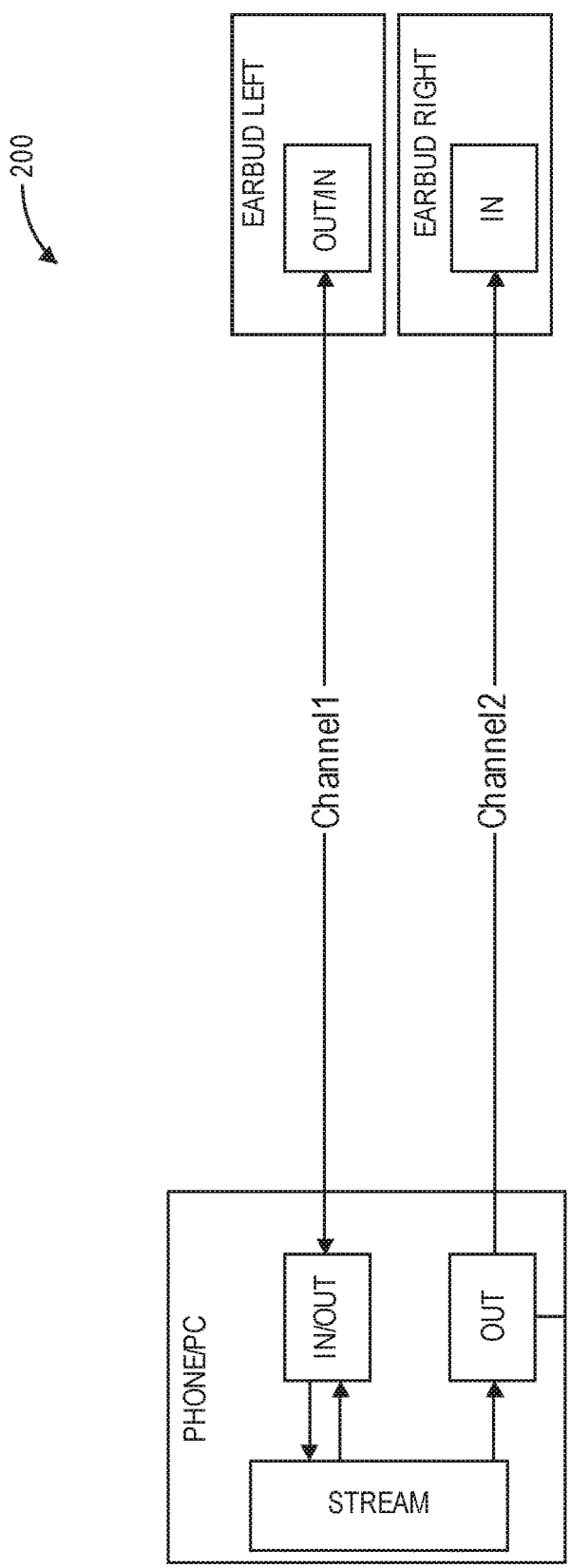
FIG. 2A illustrates a multi-channel connection between multiple devices, in accordance with one or more example embodiments of the present disclosure.

FIG. 2A illustrates a multi-channel connection 200 between multiple devices, in accordance with one or more example embodiments of the present disclosure.

In one or more embodiments, the multi-channel connection may be a Bluetooth connection between a device (e.g., a phone or personal computer) and a pair of earbuds. For example, a first channel may be established between the device and one earbud, while a second channel may be established between the device and the other earbud.

In one or more embodiments, for one audio stream, multiple link layer channels may be opened on one device. For example, when an audio stream is a voice stream and needs to be sent to two different ear pieces as for left and right channels, at least two ICO channels may need to be opened on the master device which is sending the audio contents to the two ear pieces.

It is understood that the above descriptions are for purposes of illustration and are not meant to be limiting.

FIG. 2B illustrates a table 210 for an enhanced BT channel setup, in accordance with one or more example embodiments of the present disclosure.

In one or more embodiments, ICO channel setup may be defined through the HCI command listed in the table 210. Channel commands have been defined in the current existing working specification on ICO channel enabling.

In one or more embodiments, the Stream_ID may be used by a controller on a master device to associate channels within a stream, and by the host device on both a master device and a slave device to associate the channels within an ICO stream to a specific stream.

In one or more embodiments, Channel_ID may be used by the host device to identify the channel within a stream.

In one or more embodiments, the Number_of_SubEvents parameter may be the number of sub-events per connection interval that this channel is allocated.

In one or more embodiments, the Max_Payload_Size_M_TO_S parameter may set the maximum size packet that may be used from the master device to the slave device on this ICO Channel.

In one or more embodiments, the Max_Payload_Size_S_TO_M parameter may set the maximum size packet that may be used from the slave device to master device on this ICO Channel.

In one or more embodiments, the PHY_Type_M_TO_S parameter may be a bit field that indicates the master device to slave device physical layers (PHYs) that the host device may prefer the controller to use for the ICO channel. At least one bit in this parameter may be set to 1.

In one or more embodiments, the PHY_Type_S_TO_M parameter may a bit field that indicates the slave device to master device PHYs that the host device may prefer the controller to use for the ICO Channel. At least one bit in this parameter may be set to 1.

In one or more embodiments, the FT_M_TO_S Flush timeout may be the time when a packet sent from a master device to a slave device may be flushed and may be a number of Channel_Intervals.

In one or more embodiments, the FT_S_TO_M Flush timeout may be the time when a packet sent from slave device to master device may be flushed and may be a number of Channel_Intervals.

In one or more embodiments, the BN_M_TO_S parameter may specify the number of new packets that may be sent on this channel from master device to slave device in each Channel_Interval. When the BN_M_TO_S parameter is set to zero, no channel from master device to slave device may be allocated.

In one or more embodiments, the BN_S_TO_M parameter may specify the number of new packets that may be sent on this channel from slave device to master device in each Channel_Interval. When the BN_S_TO_M parameter is set to zero, no Channel from slave device to master device is allocated.

It is understood that the above descriptions are for purposes of illustration and are not meant to be limiting.

Figure 2C:
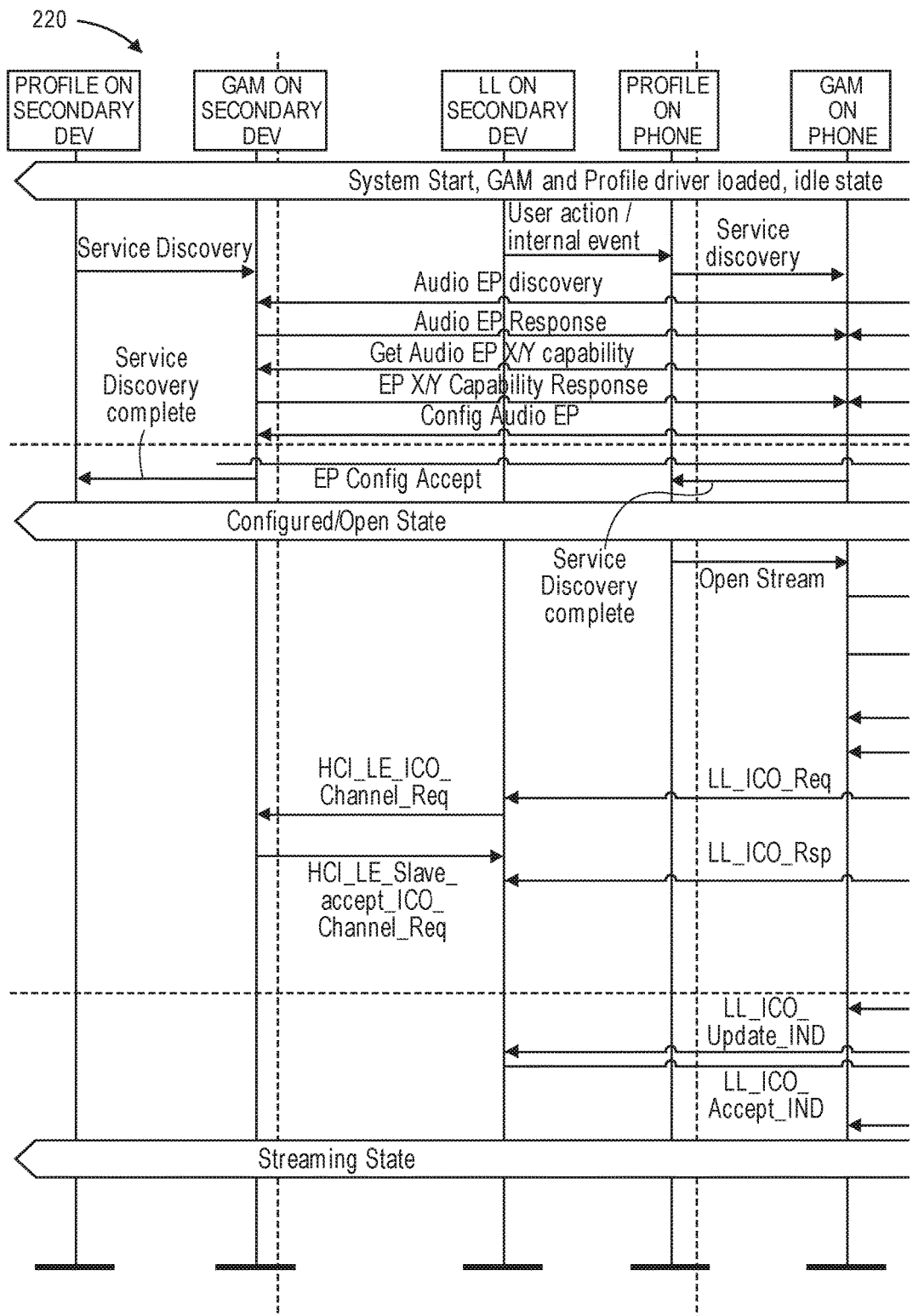
FIG. 2C illustrates a sequence for an enhanced BT channel setup, in accordance with one or more example embodiments of the present disclosure.
Figure 2C:
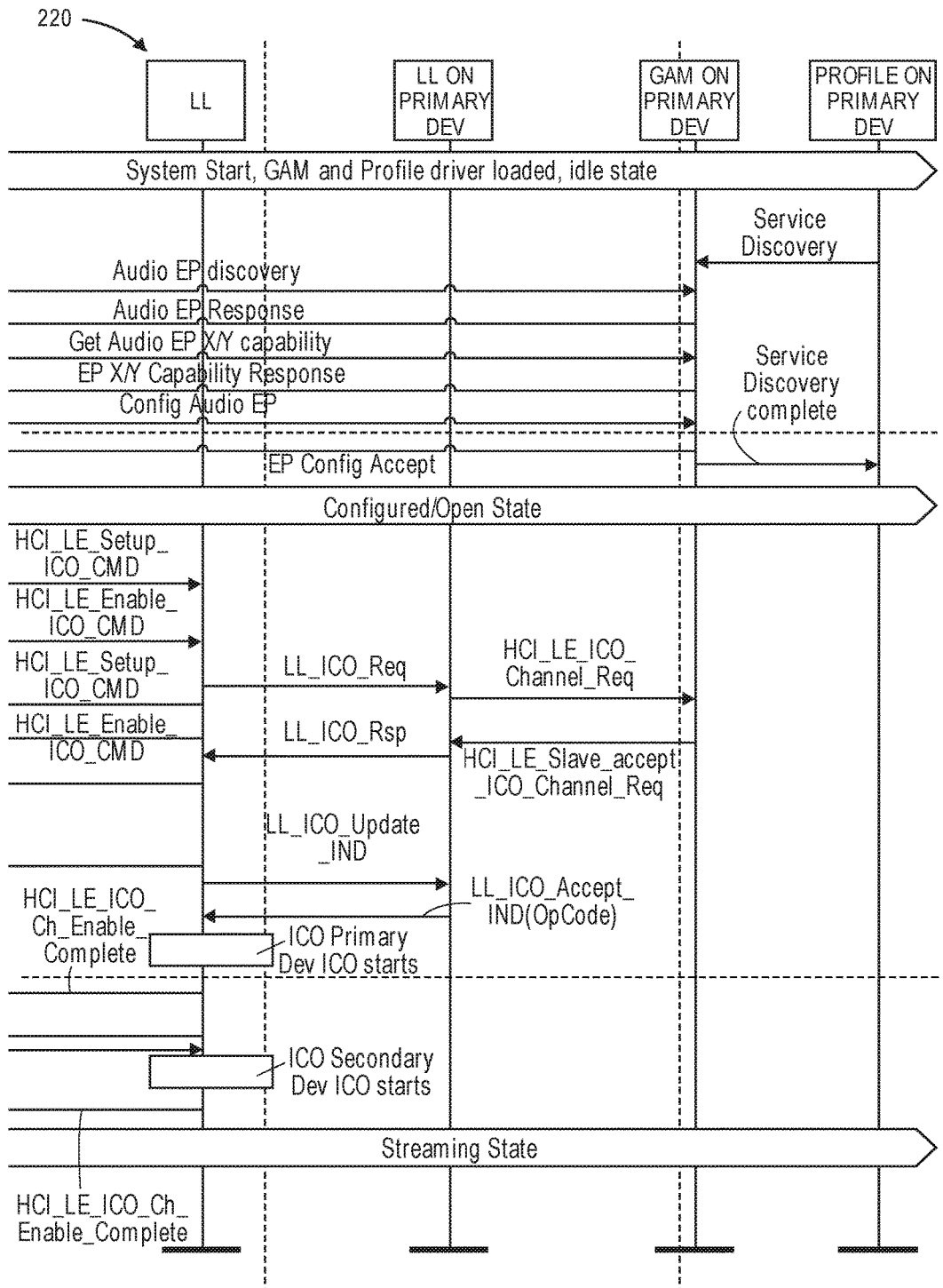

FIG. 2C illustrates a sequence 220 for an enhanced BT channel setup, in accordance with one or more example embodiments of the present disclosure.

In one or more embodiments, the time interval of open moments for the two channels may be uncertain.

It is understood that the above descriptions are for purposes of illustration and are not meant to be limiting.

Figure 2D:
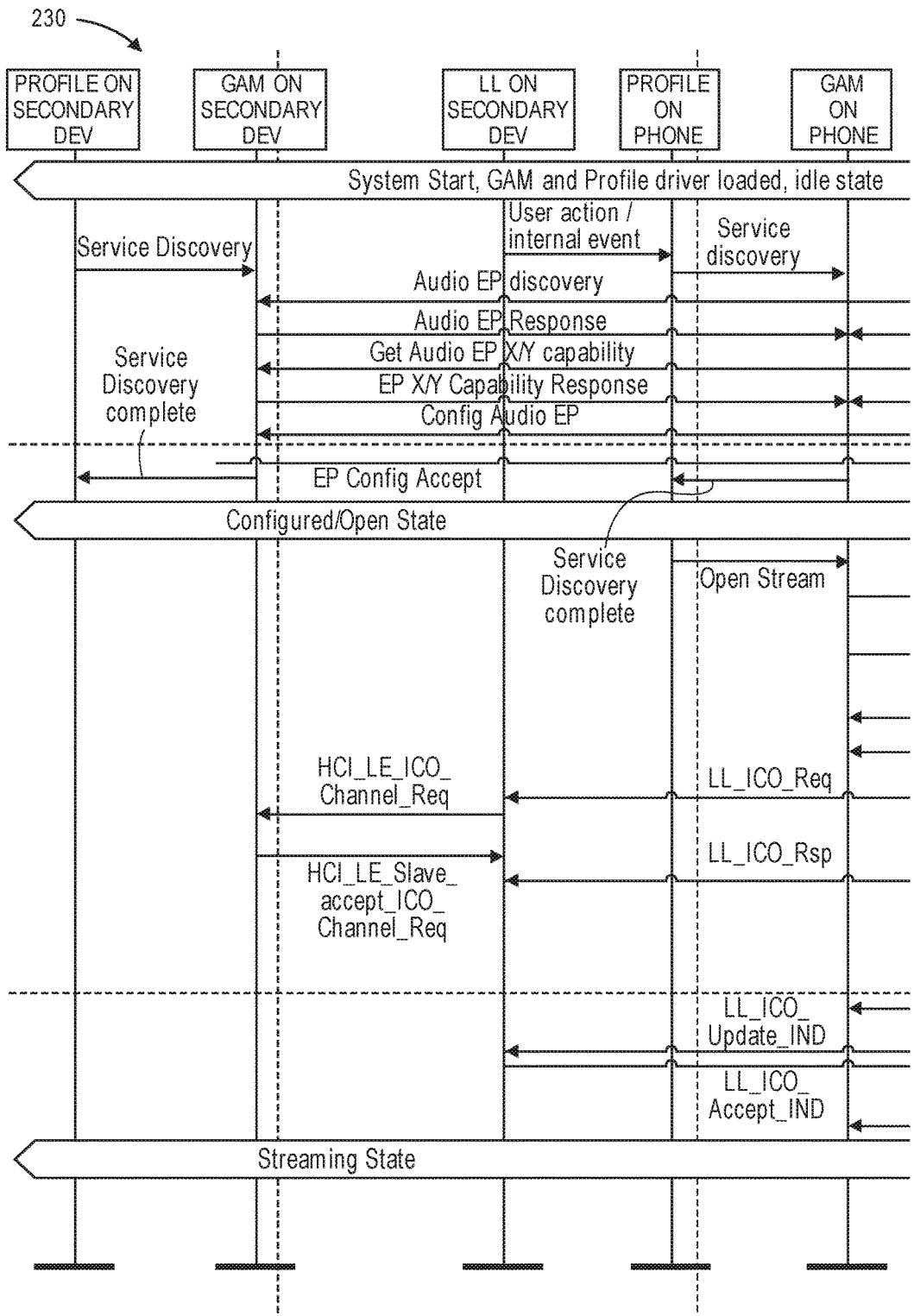
FIG. 2D illustrates a sequence for an enhanced BT channel setup, in accordance with one or more example embodiments of the present disclosure.
Figure 2D:
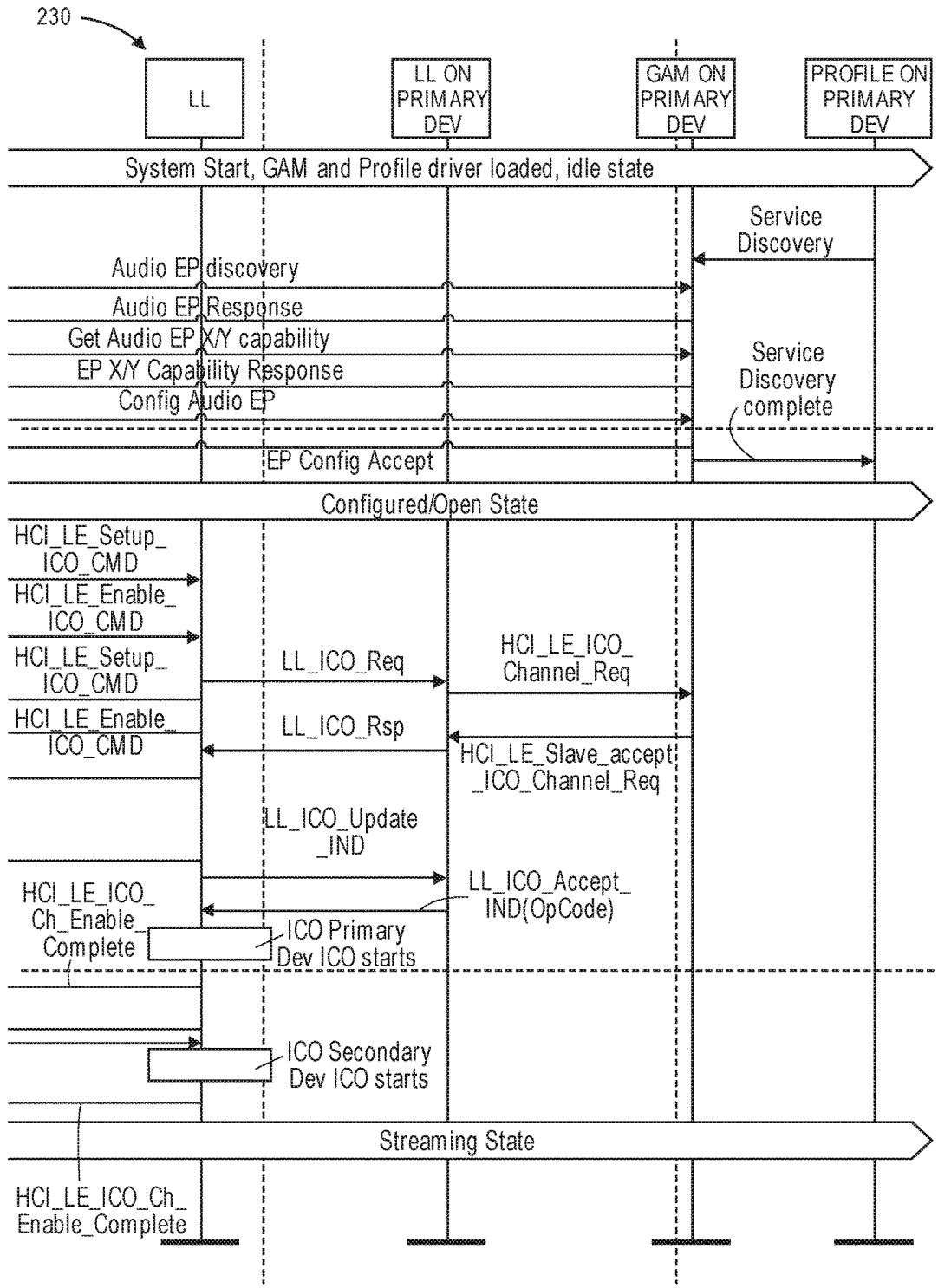

FIG. 2D illustrates a sequence 230 for an enhanced BT channel setup, in accordance with one or more example embodiments of the present disclosure.

In one or more embodiments, one or more HIC commands and one or more LL commands are added to open a channel after all channel configuration negotiation is complete. In the sequence 230, only two channels are shown so that the time interval uncertainty between the open moments for ICO channels may be better controlled, and may reduce the air medium time wasted when there is no real data to transmit.

It is understood that the above descriptions are for purposes of illustration and are not meant to be limiting.

Figure 2E:
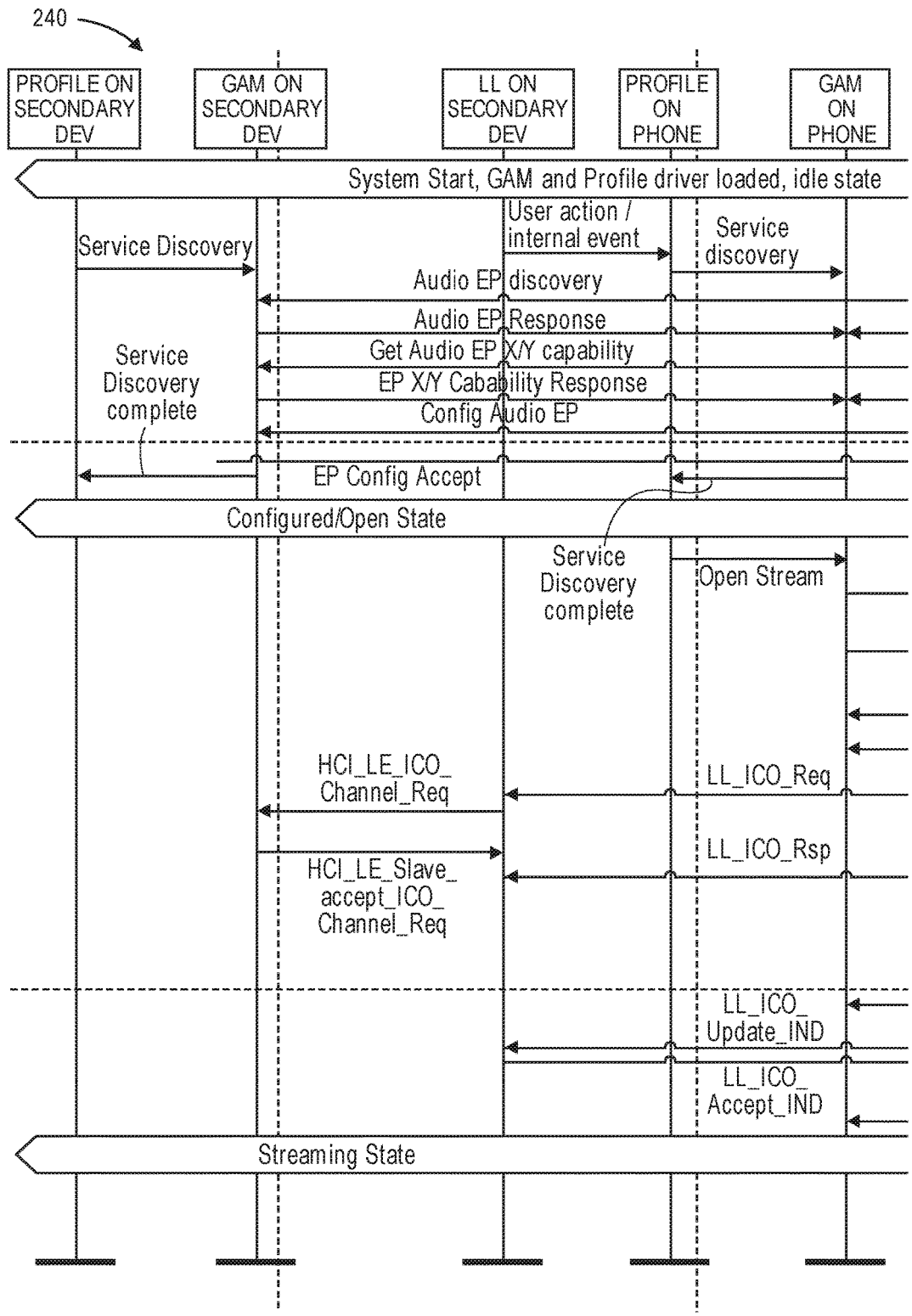
FIG. 2E illustrates a sequence for an enhanced BT channel setup, in accordance with one or more example embodiments of the present disclosure.
Figure 2E:
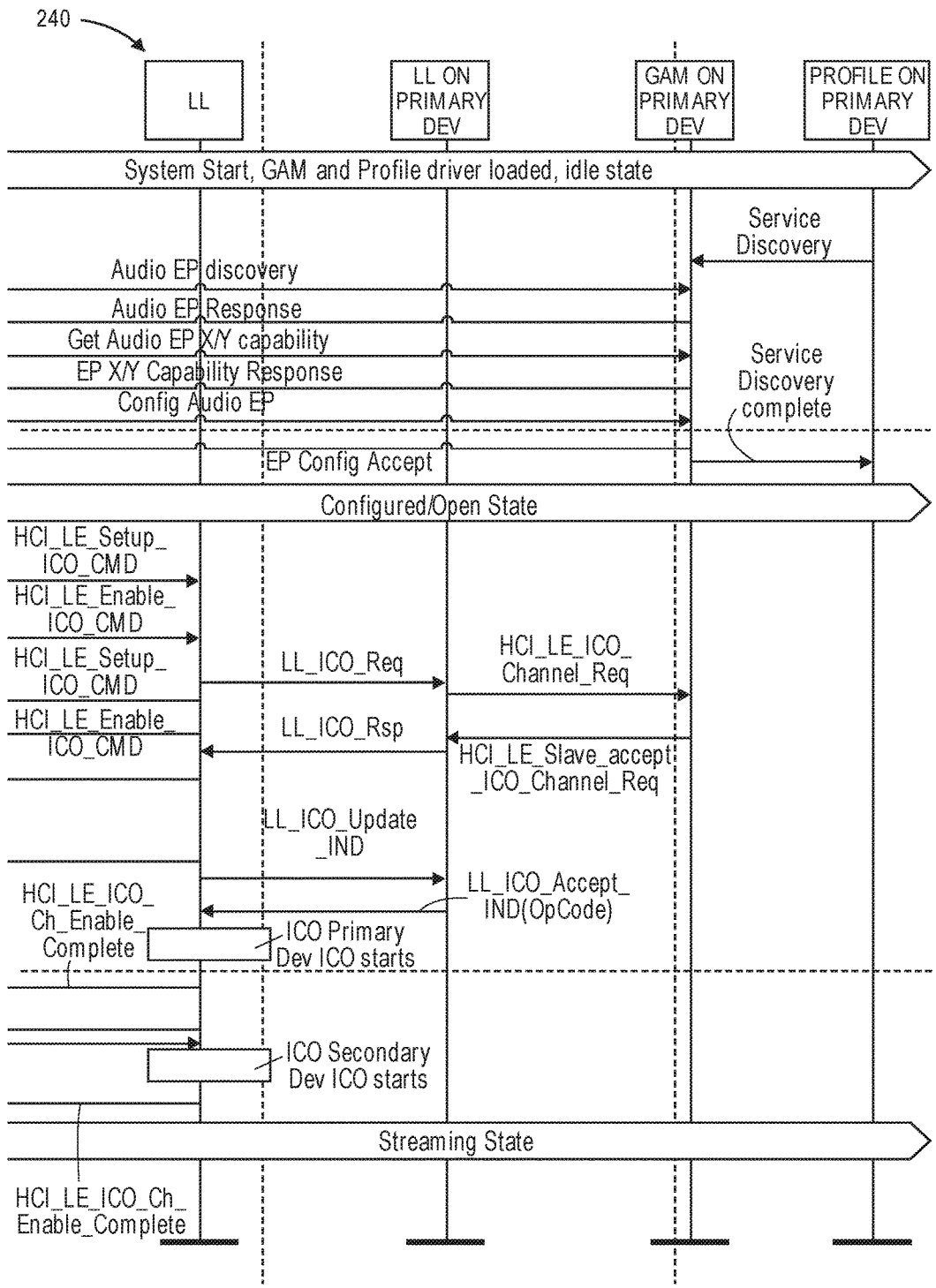

FIG. 2E illustrates a sequence 240 for an enhanced BT channel setup, in accordance with one or more example embodiments of the present disclosure.

In one or more embodiments, the same ICO channel setup parameters may need to be negotiated at least twice to setup both ICO channels for one stream.

It is understood that the above descriptions are for purposes of illustration and are not meant to be limiting.

Figure 2F:
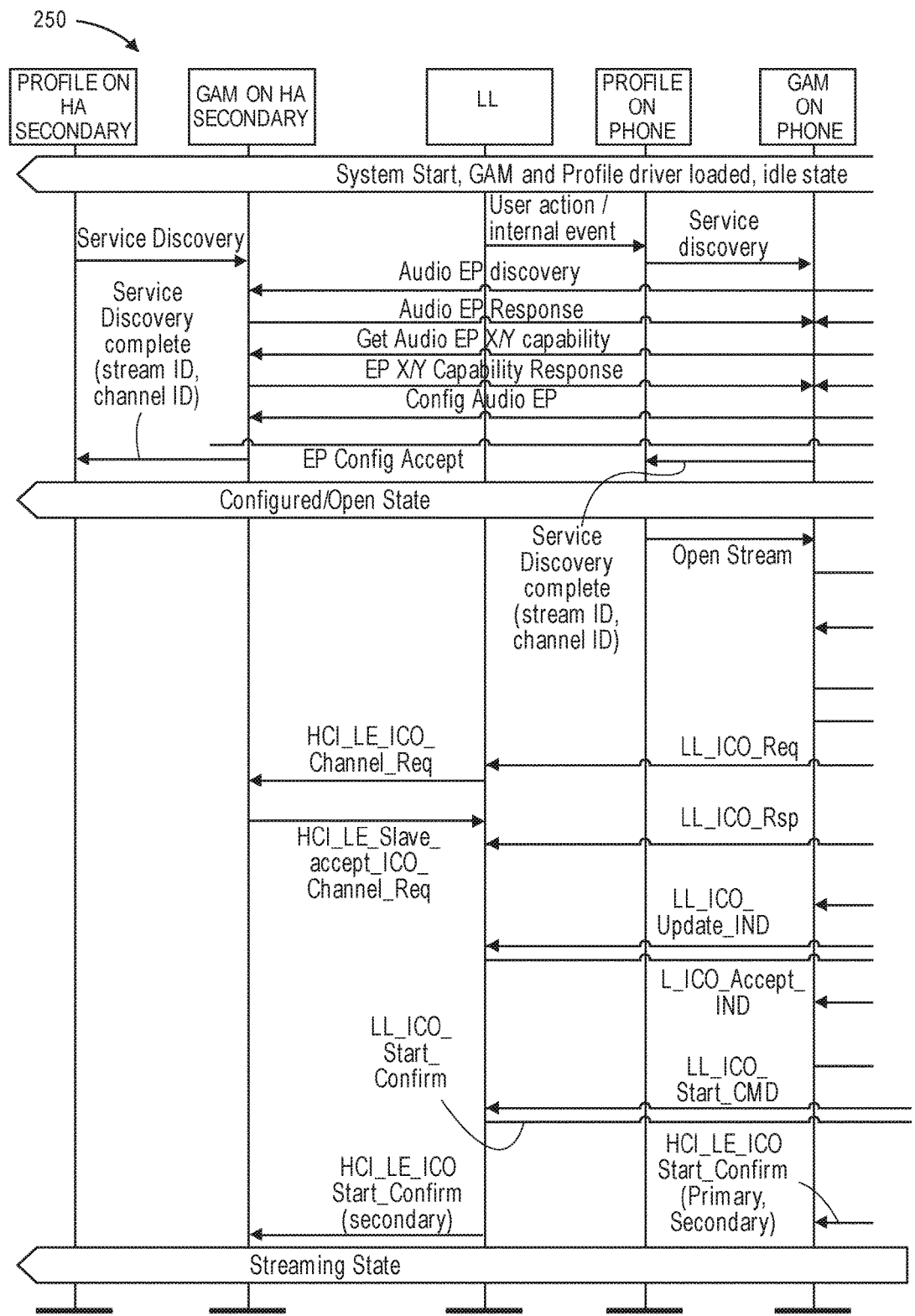
FIG. 2F illustrates a sequence for an enhanced BT channel setup, in accordance with one or more example embodiments of the present disclosure.
Figure 2F:
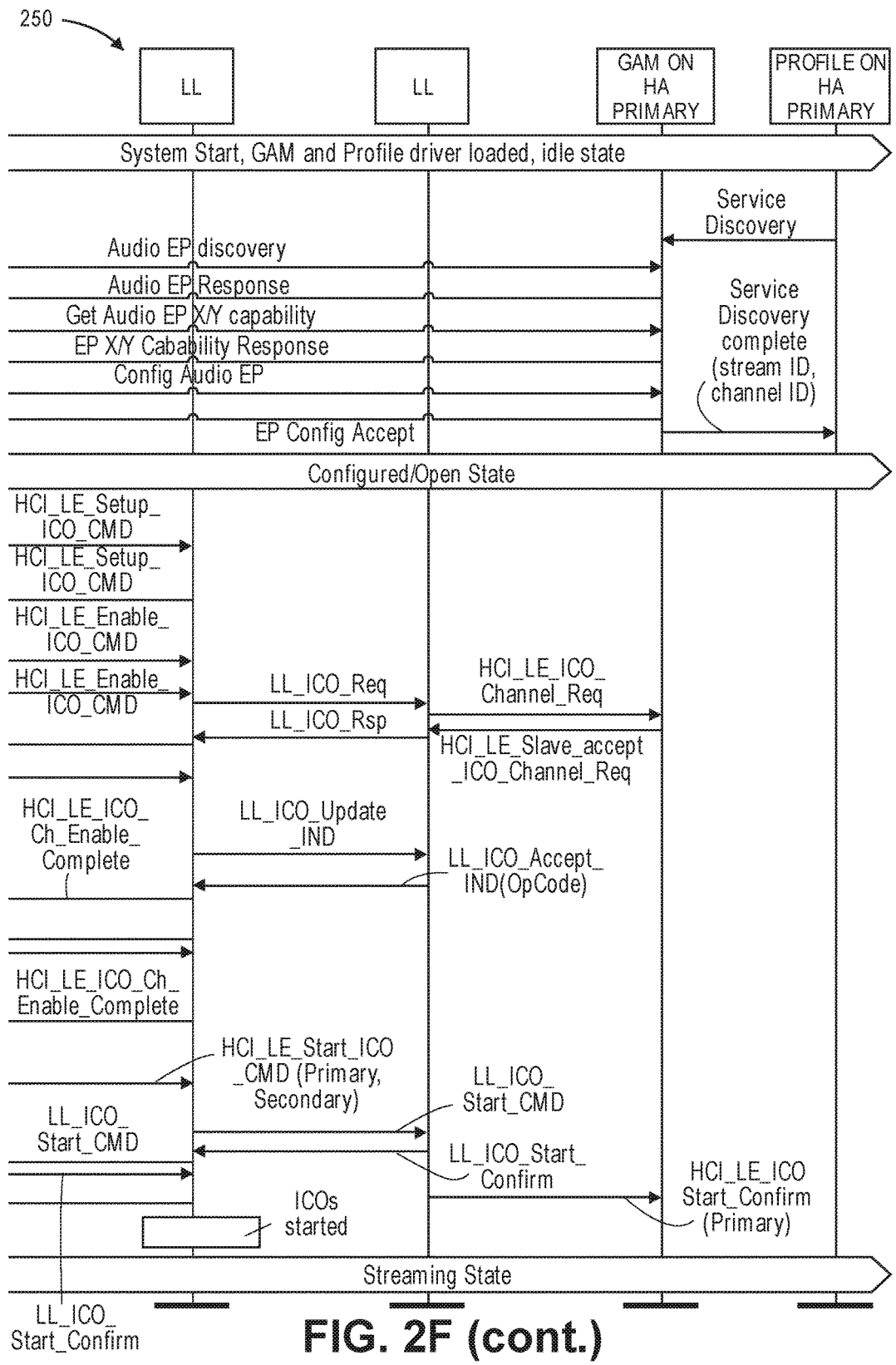

FIG. 2F illustrates a sequence 250 for an enhanced BT channel setup, in accordance with one or more example embodiments of the present disclosure.

In one or more embodiments, the sub-device, which may have both a microphone and a speaker (e.g., the primary device) may need to be functional at least to make a phone call. Thus, the sub-device may be used for ICO channel parameter negotiation, and the same set of parameters may be sent as commands to the other ear piece without further negotiation.

It is understood that the above descriptions are for purposes of illustration and are not meant to be limiting.

Figure 3:
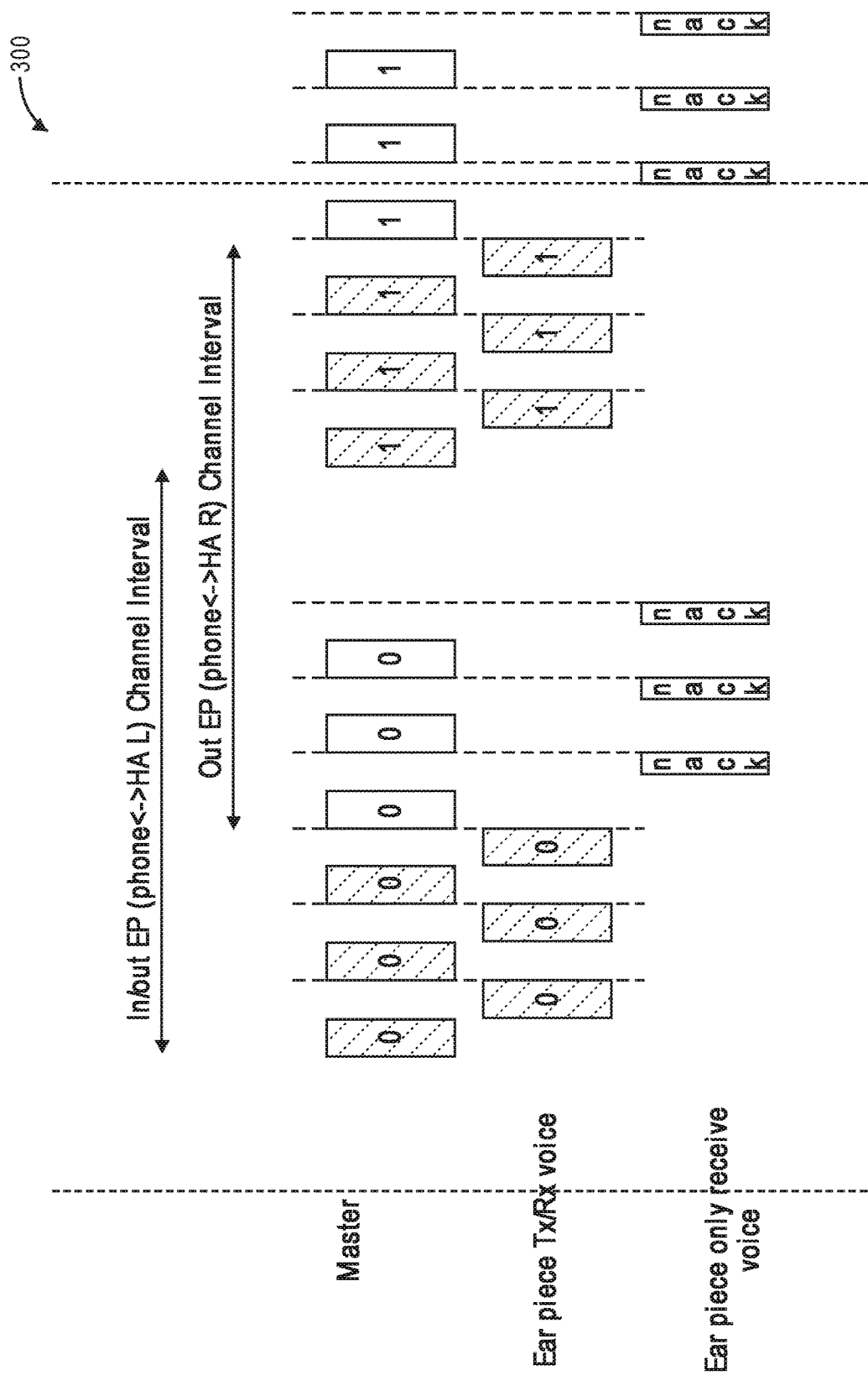
FIG. 3 illustrates a diagram for enhanced BT channel setup, in accordance with one or more example embodiments of the present disclosure.

FIG. 3 illustrates a diagram 300 for enhanced BT channel setup, in accordance with one or more example embodiments of the present disclosure.

In one or more embodiments, because of the symmetric property of voice signal itself, the master device may set up the same parameter set for both channels which end in different sub-devices. Thus, there may be no need to negotiate with two devices separately.

It is understood that the above descriptions are for purposes of illustration and are not meant to be limiting.

Figure 4A:
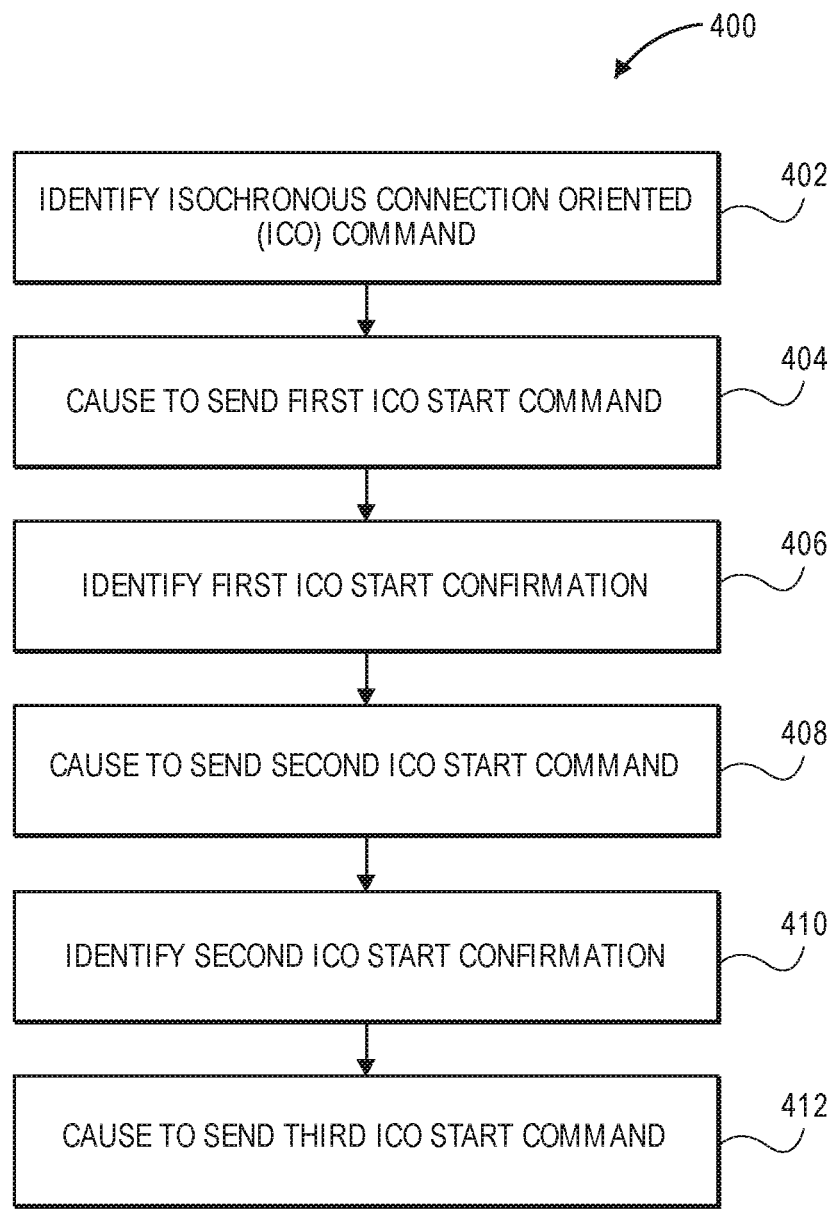
FIG. 4A illustrates a flow diagram of an illustrative process for an enhanced BT channel setup, in accordance with one or more example embodiments of the present disclosure.

FIG. 4A illustrates a flow diagram of an illustrative process 400 for an enhanced BT channel setup, in accordance with one or more example embodiments of the present disclosure.

At block 402, one or more processors for a device (e.g., user device(s) 120 of FIG. 1) may identify an ICO command.

At block 404, the one or more processors for the device may send a first ICO start command.

At block 406, the one or more processors for the device may identify a first ICO start confirmation.

At block 408, the one or more processors for the device may send a second ICO start command.

At block 410, the one or more processors for the device may identify a second ICO start confirmation.

At block 412, the one or more processors for the device may send a third ICO start command.

It is understood that the above descriptions are for purposes of illustration and are not meant to be limiting.

Figure 4B:
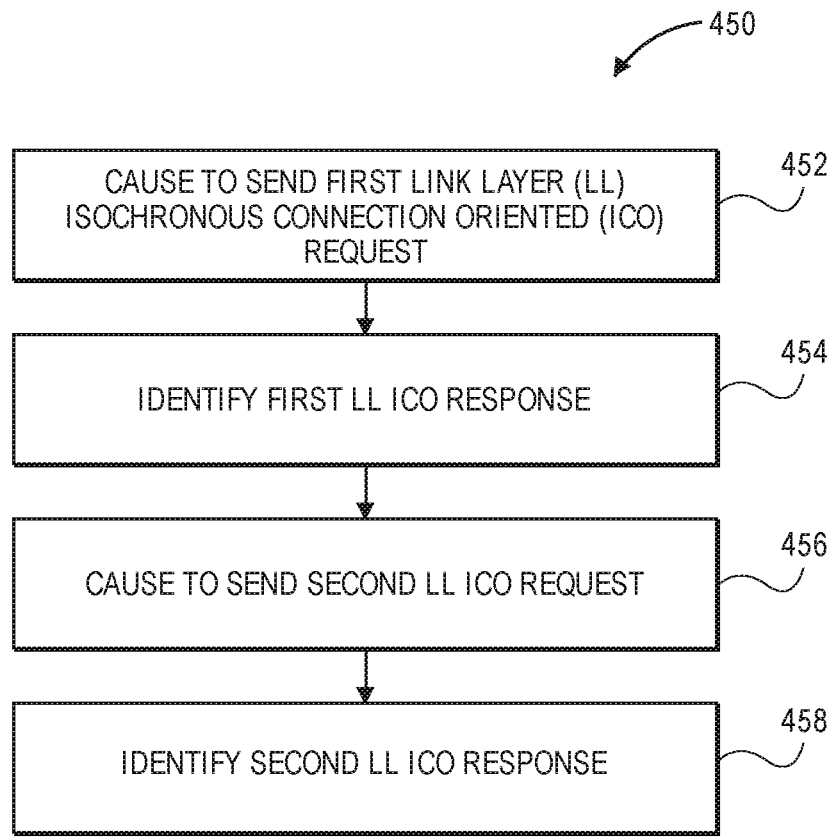
FIG. 4B illustrates a flow diagram of an illustrative process for an enhanced BT channel setup, in accordance with one or more example embodiments of the present disclosure.

FIG. 4B illustrates a flow diagram of an illustrative process 450 for an enhanced BT channel setup, in accordance with one or more example embodiments of the present disclosure.

At block 452, one or more processors for a device (e.g., user device(s) 120 of FIG. 1) may send a first LL ICO request.

At block 454, the one or more processors for the device may identify a first LL ICO response.

At block 456, the one or more processors for the device may send a second LL ICO request.

At block 458, the one or more processors for the device may cause the device to identify a second LL ICO response.

It is understood that the above descriptions are for purposes of illustration and are not meant to be limiting FIG. 5 shows a functional diagram of an exemplary communication station 500 in accordance with some embodiments. In one embodiment, FIG. 5 illustrates a functional block diagram of a communication station that may be suitable for use as a user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The transceiver 510 may be a device comprising both a transmitter and a receiver that are combined and share common circuitry (e.g., communication circuitry 502). The communication circuitry 502 may include amplifiers, filters, mixers, analog to digital and/or digital to analog converters. The transceiver 510 may transmit and receive analog or digital signals. The transceiver 510 may allow reception of signals during transmission periods. This mode is known as full-duplex, and may require the transmitter and receiver to operate on different frequencies to minimize interference between the transmitted signal and the received signal. The transceiver 510 may operate in a half-duplex mode, where the transceiver 510 may transmit or receive signals in one direction at a time.

The communications circuitry 502 may include circuitry that may operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 2A-2F, 3, 4A, and 4B.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an Enhanced Bluetooth Channel Establishment device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The Enhanced Bluetooth Channel Establishment device 619 may carry out or perform any of the operations and processes (e.g., process 400 of FIG. 4A and process 450 of FIG. 4B) described and shown above.

It is understood that the above are only a subset of what the Enhanced Bluetooth Channel Establishment device 619 may be configured to perform and that other functions included throughout this disclosure may also be performed by the Enhanced Bluetooth Channel Establishment device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising memory, processing circuitry, and a transceiver configured to transmit and receive wireless signals, the device configured to:
   identify an isochronous connection oriented (ICO) command for a communication;
   send a first ICO start command from a first link layer (LL) to a second LL;
   receive, by the first LL subsequent to said sending the first ICO start command, a first ICO start confirmation from the second LL;
   send a second ICO start command from the first LL to a third LL; and
   receive, by the first LL subsequent to said sending the second ICO start command, a second ICO start confirmation from the third LL.

2. The device of claim 1, wherein the device is further configured to send a third ICO start confirmation from the second LL.

3. The device of claim 1, wherein the device is further configured to process an audio stream from a host.

4. The device of claim 3, wherein the audio stream is to be a Bluetooth audio stream.

5. The device of claim 1, wherein the device is to be a Bluetooth device.

6. The device of claim 1, further comprising one or more antennas coupled to the transceiver.

7. A non-transitory computer-readable medium storing computer-executable instructions which when executed by one or more processors result in performing operations comprising:
   identifying an isochronous connection oriented (ICO) command for a communication;
   sending a first ICO start command from a first link layer (LL) to a second LL;
   receiving, by the first LL subsequent to sending the first ICO start command, a first ICO start confirmation from the second LL;
   sending a second ICO start command from the first LL to a third LL; and
   receiving, by the first LL subsequent to sending the second ICO start command a second ICO start confirmation from the third LL.

8. The medium of claim 7, wherein the operations further comprise sending a third ICO start confirmation from the second LL.

9. The medium of claim 7, wherein the operations include processing an audio stream from a host.

10. The medium of claim 9, wherein the audio stream is to be a Bluetooth audio stream.

11. The medium of claim 7, wherein the operations are to be performed by a Bluetooth device.

12. A method of communicating, comprising:
   identifying an isochronous connection oriented (ICO) command for a communication;
   sending a first ICO start command from a first link layer (LL) to a second LL;
   receiving, by the first LL subsequent to sending the first ICO start command, a first ICO start confirmation from the second LL;
   sending a second ICO start command from the first LL to a third LL; and
   receiving, by the first LL subsequent to sending the second ICO start command, a second ICO start confirmation from the third LL.

13. The method of claim 12, further comprising sending a third ICO start confirmation from the second LL.

14. The method of claim 12, further comprising processing an audio stream from a host.

15. The method of claim 14, wherein the audio stream is to be a Bluetooth audio stream.

16. The method of claim 12, wherein the operations of identifying, sending, and receiving are performed by a Bluetooth device.

* * * * *

UNITED STATES PATENT AND TRADEMARK OFFICE
CERTIFICATE OF CORRECTION

PATENT NO. : 10,448,437 B2
APPLICATION NO. : 16/039643
DATED : October 15, 2019
INVENTOR(S) : Xuemei Ouyang et al.

Page 1 of 1

It is certified that error appears in the above-identified patent and that said Letters Patent is hereby corrected as shown below:

In the Claims

In Column 16, Line 4, in Claim 7, delete "command" and insert --command,--, therefor.

Signed and Sealed this
Tenth Day of December, 2019

Andrei Iancu
*Director of the United States Patent and Trademark Office*